(12) United States Patent
Min

(10) Patent No.: US 7,874,834 B2
(45) Date of Patent: Jan. 25, 2011

(54) AIR FUEL RATIO SENSOR OF INCINERATOR

(75) Inventor: Tae-Sik Min, Dongjak-gu (KR)

(73) Assignee: Kyungdong Network Co., Ltd., Seoul (KR)

( * ) Notice: Subject to any disclaimer, the term of this patent is extended or adjusted under 35 U.S.C. 154(b) by 865 days.

(21) Appl. No.: 11/795,111

(22) PCT Filed: Jan. 11, 2006

(86) PCT No.: PCT/KR2006/000107

§ 371 (c)(1),
(2), (4) Date: Jul. 11, 2007

(87) PCT Pub. No.: WO2006/075864

PCT Pub. Date: Jul. 20, 2006

(65) Prior Publication Data

US 2008/0113307 A1     May 15, 2008

(30) Foreign Application Priority Data

Jan. 12, 2005 (KR) .................. 10-2005-0002797

(51) Int. Cl.
*F23N 1/00* (2006.01)
*F24H 3/00* (2006.01)
(52) U.S. Cl. .............. 431/90; 431/31; 431/89; 431/19; 236/15 C; 137/488
(58) Field of Classification Search .............. 431/90, 431/31, 89, 19; 236/15 C; 137/488, 489
See application file for complete search history.

(56) References Cited

U.S. PATENT DOCUMENTS

| | | | |
|---|---|---|---|
| 4,385,887 A | 5/1983 | Yamamoto et al. | |
| 4,435,151 A | 3/1984 | Matumoto et al. | |
| 5,984,664 A | 11/1999 | Sutton | |
| 6,283,145 B1 * | 9/2001 | Fenn | 137/489 |
| 6,517,342 B2 * | 2/2003 | van der Veen | 431/72 |
| 6,749,423 B2 * | 6/2004 | Fredricks et al. | 431/90 |
| 7,101,172 B2 * | 9/2006 | Jaeschke | 431/19 |
| 7,249,610 B2 * | 7/2007 | Moses | 137/488 |
| 7,735,743 B2 * | 6/2010 | Jaeschke | 236/11 |

* cited by examiner

*Primary Examiner*—Steven B McAllister
*Assistant Examiner*—Nikhil Mashruwala
(74) *Attorney, Agent, or Firm*—Nelson Mullins Riley & Scarborough LLP; Thomas V. Smurzynski; Anthony A. Laurentano

(57) ABSTRACT

Disclosed is a combustion apparatus using an air fuel ratio sensor, which detects the operation of the air fuel sensor based on pressure of gas and air introduced into a combustion chamber and adjusts the amount of gas and air introduced into the combustion chamber using a controller based on data detected by the air fuel sensor. The combustion apparatus includes a combustion chamber of a boiler; a blower installed in an air feeding line communicated with the the combustion chamber; an electronic proportional gas valve installed in a gas feeding line communicated with the combustion chamber; an air fuel ratio sensor including a movement section connected to the combustion chamber, the blower and the electronic proportional gas valve and moved up and down according to pneumatic pressure supplied thereto from the combustion chamber, the blower and the electronic proportional gas valve, and a distance sensor for detecting a moving distance of the movement section; and a controller for adjusting an amount of gas and air based on data detected by the distance sensor.

6 Claims, 4 Drawing Sheets

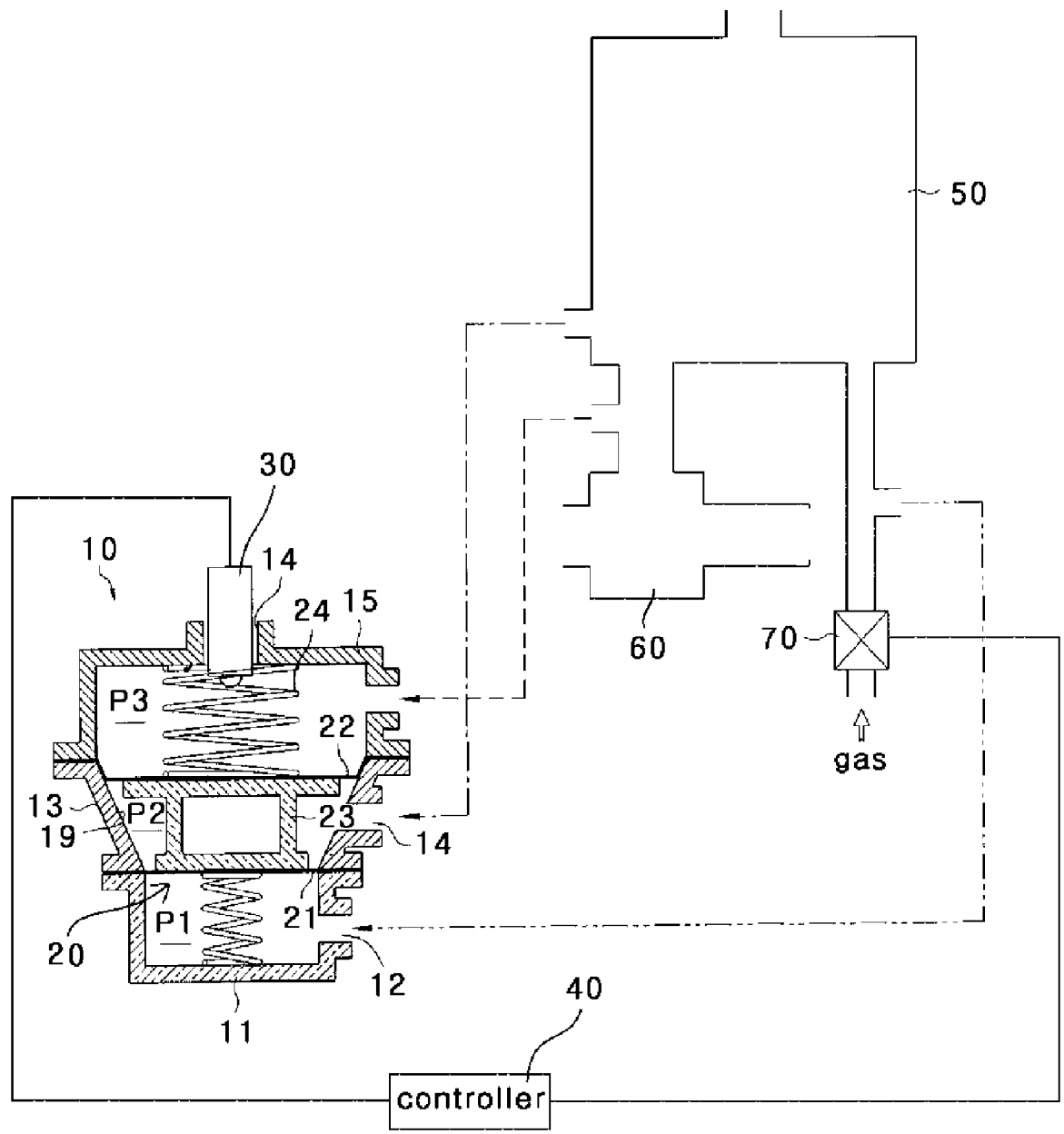

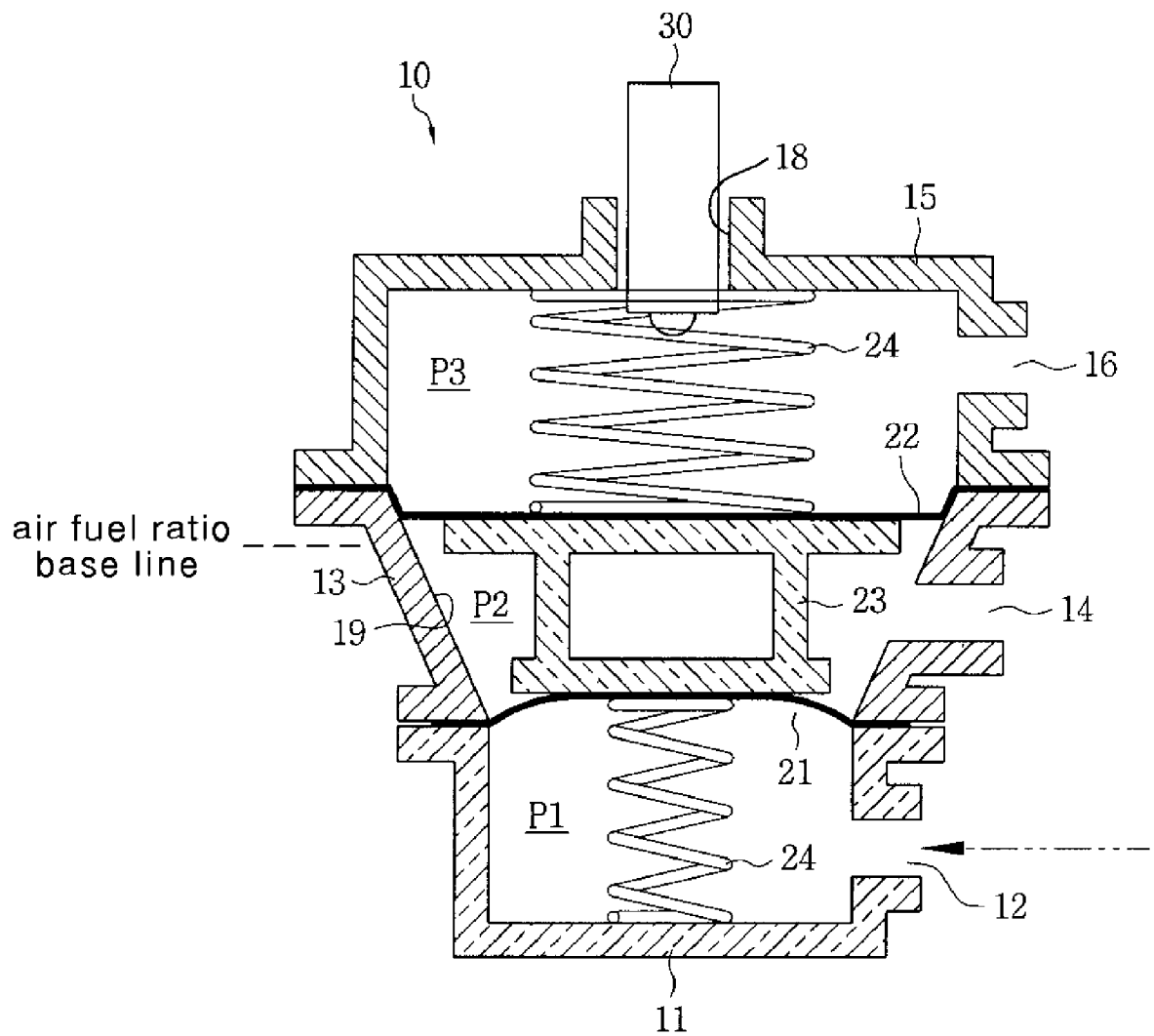
[Fig. 2]

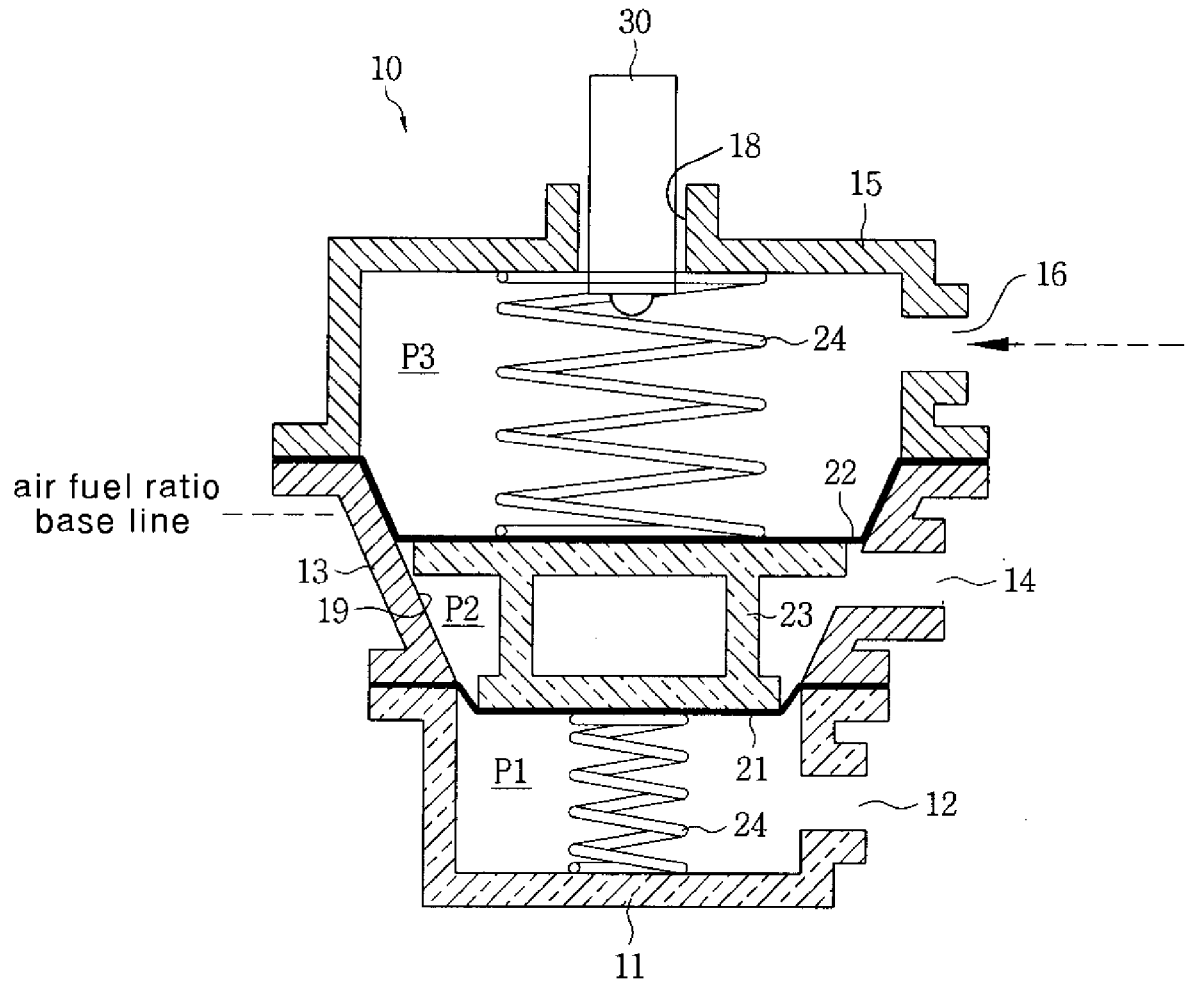
[Fig. 3]
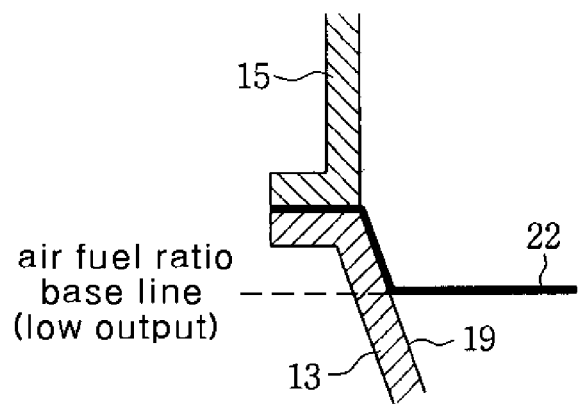
[Fig. 4]

[Fig. 5]
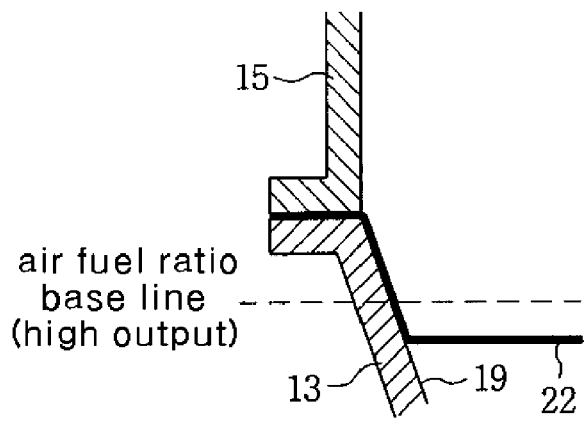
[Fig. 6]
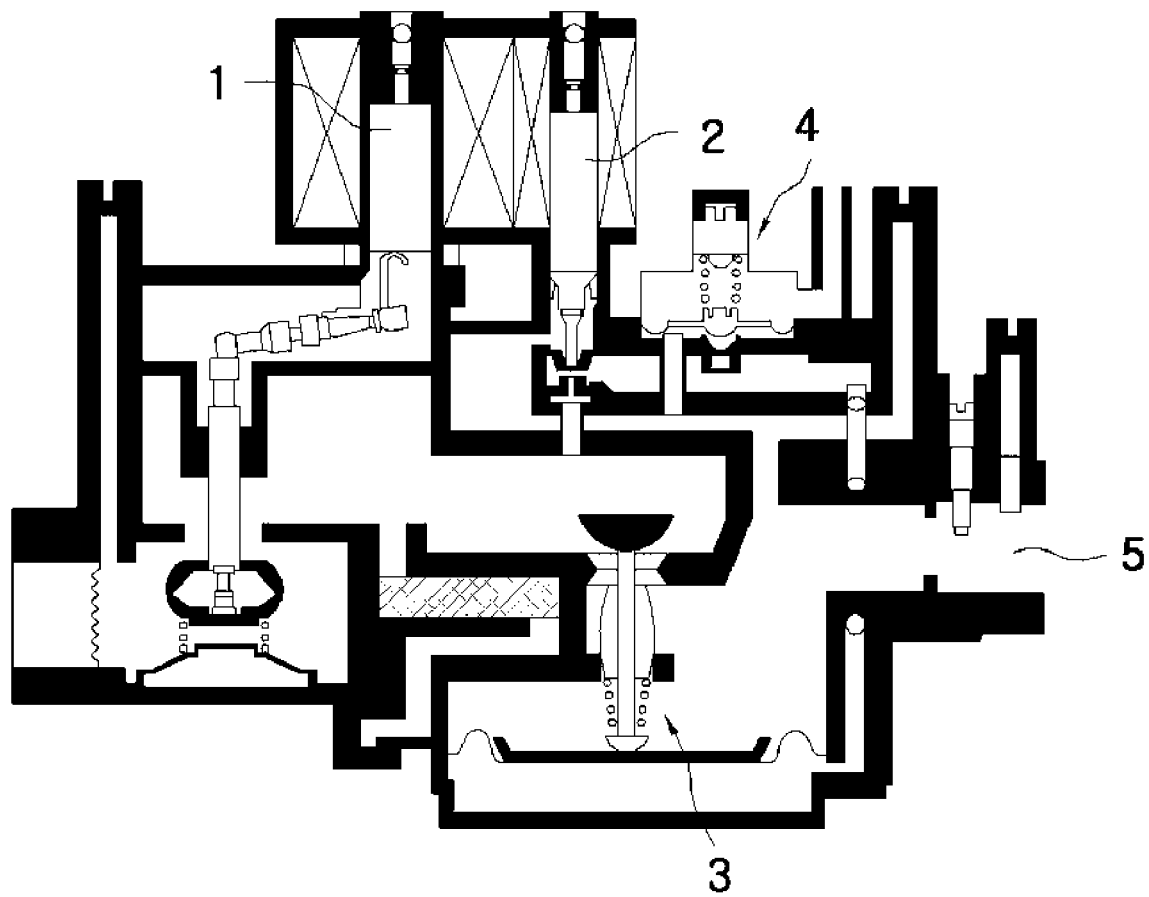

AIR FUEL RATIO SENSOR OF INCINERATOR

TECHNICAL FIELD

The present invention relates to a combustion apparatus using an air fuel ratio sensor. More particularly, the present invention relates to a combustion apparatus using an air fuel ratio sensor, which can detect the operation of the air fuel sensor based on pressure of gas and air introduced into a combustion chamber and adjust the amount of gas and air introduced into the combustion chamber by using a controller based on data detected by the air fuel sensor.

BACKGROUND ART

A gas valve shown in FIG. 6 is used for a premix-type burner. According to the operation of such a pneumatic gas valve, in a state in which first and second solenoid valves 1 and 2 are opened, if gas pressure rises at an inlet 5, an air adjustment valve 4 is moved up. Thus, pressure below the air adjustment valve 4 is dropped, so that a gas adjustment valve 3 is moved down, thereby allowing gas to be introduced into the combustion chamber with predetermined gas pressure.

In addition, if gas pressure drops at the inlet 5, the air adjustment valve 4 is moved down. Thus, pressure below the air adjustment valve 4 rises, so that the gas adjustment valve 3 is moved up, thereby allowing gas and air to be introduced into the combustion chamber with a predetermined mixing ratio.

In addition, when air pressure rises, the air adjustment valve 4 is moved down, so pressure below the gas adjustment valve 3 rises. Accordingly, the gas adjustment valve 3 is moved up so that gas pressure may rise at the inlet, so that gas and air are introduced into the combustion chamber with a predetermined mixing ratio.

In contrast, when air pressure drops, the air adjustment valve 4 is moved up, so pressure below the gas adjustment valve 3 drops. Accordingly, the gas adjustment valve 3 is moved down so that gas pressure may drop at the outlet, so that gas and air are introduced into the combustion chamber with a predetermined mixing ratio.

Such a conventional pneumatic gas valve is operated by means of pneumatic pressure generated from a fan.

Accordingly, the pneumatic pressure generated from the fan must be identical to gas pressure fed into the gas valve. Therefore, it is necessary to significantly increase the pneumatic pressure generated from the fan.

In addition, the air fuel ratio at a high output becomes equal to the air fuel ratio at a low output. That is, it is difficult to adjust the air fuel ratio according to the output even if it is necessary to reduce the air fuel ratio at the high output for improving the combustion efficiency and to increase the air fuel ratio at the low output for preventing erosion of a heat exchanger caused by condensation of exhaust gas.

In addition, the structure of the conventional pneumatic gas valve is complicated, so that the manufacturing cost thereof may be increased.

DISCLOSURE OF INVENTION

Technical Problem

An object of the present invention is to provide a combustion apparatus using an air fuel ratio sensor, which can optimize an air fuel ratio according to the output thereby preventing CO from being generated due to imperfect combustion and can prevent air from being excessively introduced thereby improving the combustion efficiency of a boiler.

Another object of the present invention is to provide a combustion apparatus using an air fuel ratio sensor, which is applicable for a conventional boiler employing an electric proportional gas valve and a fan generating relatively low pneumatic pressure, thereby improving compatibility of the product.

Technical Solution

In order to accomplish the above object, according to the present invention, there is provided a combustion apparatus comprising: a combustion chamber of a boiler; a blower installed in an air feeding line communicated with the combustion chamber; an electronic proportional gas valve installed in a gas feeding line communicated with the combustion chamber; an air fuel ratio sensor including a movement section connected to the combustion chamber, the blower and the electronic proportional gas valve and moved up and down according to pneumatic pressure supplied thereto from the combustion chamber, the blower and the electronic proportional gas valve, and a distance sensor for detecting a moving distance of the movement section; and a controller for adjusting an amount of gas and air based on data detected by the distance sensor.

According to the preferred embodiment of the present invention, the air fuel ratio sensor includes a first housing formed at one side thereof with a gas port for allowing gas to be introduced into the first housing, a second housing coupled to an upper portion of the first housing and formed at one side thereof with a pressure port for allowing pressure in the combustion chamber to be introduced into the second housing, a third housing coupled to an upper portion of the second housing and formed at one side thereof with a pressure port for allowing pressure in the blower to be introduced into the third housing, the movement section installed between first to third housings and moved up and down by a predetermined distance according to gas pressure and pressure applied thereto from the blower and the combustion chamber, and the distance sensor for detecting the moving distance of the movement section.

In addition, a first spring having predetermined elastic force is installed between the first housing and a first diaphragm and a second spring having predetermined elastic force is installed between the third housing and a second diaphragm.

The distance sensor is selectively installed in the first housing or the third housing.

An inclined section is formed at an inner peripheral surface of the second housing.

Advantageous Effects

According to the present invention, the air fuel ratio can be optimized, so that generation of CO derived from imperfect combustion can be prevented.

In addition, the combustion apparatus according to the present invention is applicable for a conventional boiler employing an electric proportional gas valve and a fan generating relatively low pneumatic pressure, so that compatibility of the product can be improved.

Furthermore, the combustion apparatus according to the present invention can reduce the air fuel ratio under a high output in a combustion chamber, thereby improving the combustion efficiency, and can increase the air fuel ratio under a low output in the combustion chamber such that the dew point temperature of exhaust gas may rise, thereby expanding the life span of a boiler.

BRIEF DESCRIPTION OF THE DRAWINGS

FIG. 1 is a schematic view illustrating a combustion apparatus using an air fuel sensor according to one embodiment of the present invention;

FIGS. 2 and 3 are sectional views illustrating operational states of an air fuel sensor according to one embodiment of the present invention;

FIGS. 4 and 5 are sectional views partially illustrating an air fuel sensor according to another embodiment of the present invention; and FIG. 6 is a schematic view illustrating a conventional proportional valve.

BEST MODE FOR CARRYING OUT THE INVENTION

Hereinafter, preferred embodiments of the present invention will be described in detail with reference to accompanying drawings.

FIG. 1 is a schematic view illustrating a combustion apparatus using an air fuel sensor according to one embodiment of the present invention, FIGS. 2 and 3 are sectional views illustrating operational states of the air fuel sensor according to one embodiment of the present invention, and FIGS. 4 and 5 are sectional views partially illustrating an air fuel sensor according to another embodiment of the present invention.

As shown in FIGS. 1 to 3, the combustion apparatus according to the present invention includes a combustion chamber 50 of a boiler, a blower 60 installed in an air feeding line communicated with the combustion chamber 50, an electronic proportional gas valve 70 installed in a gas feeding line communicated with the combustion chamber 50, an air fuel ratio sensor 10 including a movement section 20 connected to the combustion chamber 50, the blower 60 and the electronic proportional gas valve 70 and moved up and down according to pneumatic pressure supplied thereto from the combustion chamber 50, the blower 60 and the electronic proportional gas valve 70, and a distance sensor 30 for detecting the moving distance of the movement section 20, and a controller 40 for adjusting the amount of gas and air based on data detected by the distance sensor 30.

The air fuel ratio sensor 10 includes first, second and third housings 11, 13 and 15 and the movement section 20 installed in the first, second and third housings 11, 13 and 15 such that the movement section 20 can move up and down according to gas and air pressure applied thereto.

An upper portion of the first housing 11 is opened and a predetermined cavity is formed in the first housing 11. A gas port 12 is formed at one side of the first housing so as to allow gas to be introduced into the first housing 11.

The second housing 13 is coupled to an upper portion of the first housing 11. Upper and lower portions of the second housing 13 are opened and a predetermined cavity is formed in the second housing 13. A pressure port 14 is formed at one side of the second housing 13 so as to allow pressure in the combustion chamber to be introduced into the second housing 13. In addition, an inclined section 19 is formed at an inner peripheral surface of the second housing 13.

The third housing 15 is coupled to an upper portion of the second housing 13. A lower portion of the third housing 15 is opened and a predetermined cavity is formed in the third housing 15. A pressure port 16 is formed at one side of the third housing 15 so as to allow pressure in the blower 60 to be introduced into the third housing 15. An insertion hole 18 is formed at an upper portion of the third housing 15.

Meanwhile, sealing members can be installed between the first and second housings 11 and 13 or between the second and third housings 13 and 15.

The movement section 20 includes a first diaphragm 21 fixed between the first and second housings 11 and 13, a first spring 24 vertically installed between the first diaphragm 21 and the first housing 11, a second diaphragm 22 fixed between the second and third housings 13 and 15, and a connection member 23 installed between the first and second diaphragms 21 and 22, and a second spring 24 vertically installed between the second diaphragm 22 and an inner upper portion of the third housing 15. In addition, a sectional area of the second diaphragm 22 is larger than that of the first diaphragm 22 so that the air fuel ratio can be measured even under low pressure of the blower 60.

The distance sensor 30 is inserted into the insertion hole 18 of the third housing 15 so as to detect the moving distance of the movement section 20 and to transmit data thereof to the controller 40.

The distance sensor 30 can be selectively installed in the first housing 11 or the third housing 15.

The air fuel ratio sensor 10 has a cylindrical structure and includes a diaphragm made from rubber.

The controller 40 receives data from the distance sensor 30 of the air fuel ratio sensor 10 and controls the blower 60 and the electric proportional gas valve 70 according to the output level and the air fuel ratio based on the data.

Hereinafter, the operation and effect of the present invention having the above structure will be described.

As shown in FIG. 2, when a great amount of gas is introduced into the first housing 11 through the gas port 12, gas pressure P1 in the first housing 11 rises so that the first diaphragm 21 moves up while lifting up the connection member 23. Thus, the second diaphragm 22 is also moved by a distance corresponding to the moving distance of the connection member 23.

At this time, the second diaphragm 22 is elastically biased by means of the second spring 24 installed on the second diaphragm 22.

The distance sensor 30 detects the moving distance of the second diaphragm 22 and sends data thereof to the controller 40. Upon receiving the data from the distance sensor 30, the controller 40 controls the electronic proportional gas valve so as to control pressure of gas introduced into the combustion chamber 50 in such a manner that a predetermined amount of gas and air can be introduced into the combustion chamber 50 with a predetermined mixing ratio.

As shown in FIG. 3, when air pressure suddenly rises caused by sudden increase of R.P.M. of the blower 60, the amount of air supplied from the blower 60 is increased so that a great amount of air is introduced into the third housing 15 through the pressure port 16. Thus, air pressure P3 in the third housing 15 may rise, so that the second diaphragm 22 moves down along the inclined surface 19 while sequentially moving down the connection member 23 and the first diaphragm 21.

At this time, the first diaphragm 21 is elastically biased by means of the spring 24 installed below the first diaphragm 21.

In this state, the distance sensor 30 detects the moving distance of the second diaphragm 22 and sends data thereof to the controller 40. Upon receiving the data from the distance sensor 30, the controller 40 controls the R.P.M. of the blower 60 so as to control pressure of air introduced into the combustion chamber 50 in such a manner that a predetermined amount of gas and air can be introduced into the combustion chamber 50 with a predetermined mixing ratio.

In this manner, if the air fuel ratio is relatively increased, air pressure generated from the blower 60 is adjusted to a level relatively higher than that of gas pressure. That is, if the air pressure generated from the blower 60 is relatively increased, the movement section 20 moves down so that the sectional area of the second diaphragm 22 is reduced, thereby balancing the force applied to upper and lower portions of the movement section 20.

Meanwhile, if the air fuel ratio is relatively reduced, the air pressure generated from the blower 60 is adjusted to a level relatively lower than that of the gas pressure. Therefore, the movement section 20 moves up so that the sectional area of the second diaphragm 22 is enlarged, thereby balancing the force applied to upper and lower portions of the movement section 20.

MODE FOR THE INVENTION

FIG. 4 shows a case where a low output is realized in the combustion chamber 50. In this case, the air fuel ratio is increased such that the dew point temperature of exhaust gas can be raised, thereby preventing vapor contained in the exhaust gas from being condensed.

That is, the air pressure generated from the blower 60 is adjusted to a level relatively higher than that of the gas pressure, thereby raising the dew point temperature of the exhaust gas.

FIG. 5 shows a case where a high output is realized in the combustion chamber 50. In this case, the air fuel ratio is reduced such that the combustion apparatus can be operated with improved combustion efficiency.

That is, the air pressure generated from the blower 60 is adjusted to a level relatively lower than that of the gas pressure, thereby improving the combustion efficiency.

INDUSTRIAL APPLICABILITY

As can be seen from the foregoing, the present invention can improve the combustion efficiency of the boiler and is applicable for the conventional boiler employing the electric proportional gas valve and a blowing fan generating relatively low air pressure.

The invention claimed is:

1. A combustion apparatus comprising:
a combustion chamber of a boiler;
a blower installed in an air feeding line communicated with the combustion chamber;
an electronic proportional gas valve installed in a gas feeding line communicated with the combustion chamber;
an air fuel ratio sensor including a movement section connected to the combustion chamber, the blower and the electronic proportional gas valve and moved up and down according to pneumatic pressure supplied thereto from the combustion chamber, the blower and the electronic proportional gas valve, and a distance sensor for detecting a moving distance of the movement section; and
a controller for controlling the blower and the electronic proportional gas valve based on data detected by the distance sensor.

2. The combustion apparatus as claimed in claim 1, wherein the air fuel ratio sensor includes a first housing formed at one side thereof with a gas port for allowing gas to be introduced into the first housing, a second housing coupled to an upper portion of the first housing and formed at one side thereof with a pressure port for allowing pressure in the combustion chamber to be introduced into the second housing, a third housing coupled to an upper portion of the second housing and formed at one side thereof with a pressure port for allowing pressure in the blower to be introduced into the third housing, the movement section installed between first to third housings and moved up and down by a pre-determined distance according to gas pressure and pressure applied thereto from the blower and the combustion chamber, and the distance sensor for detecting the moving distance of the movement section.

3. The combustion apparatus as claimed in claim 1 or 2, wherein the movement section includes a first diaphragm installed between the first and second housings, a second diaphragm installed between the second and third housings, and a connection member interposed between the first and second diaphragms.

4. The combustion apparatus as claimed in claim 3, wherein a first spring having predetermined elastic force is installed between the first housing and the first diaphragm and a second spring having predetermined elastic force is installed between the third housing and the second diaphragm.

5. The combustion apparatus as claimed in claim 1 or 2, wherein an inclined section is formed at an inner peripheral surface of the second housing.

6. The combustion apparatus as claimed in claim 1 or 2, wherein the distance sensor is selectively installed in the first housing or the third housing.

\* \* \* \* \*